(No Model.)
L. P. McGONIGLE & J. H. BIGHAM.
SEED DROPPING ATTACHMENT FOR CHECK ROW CORN PLANTERS.
No. 264,550. Patented Sept. 19, 1882.
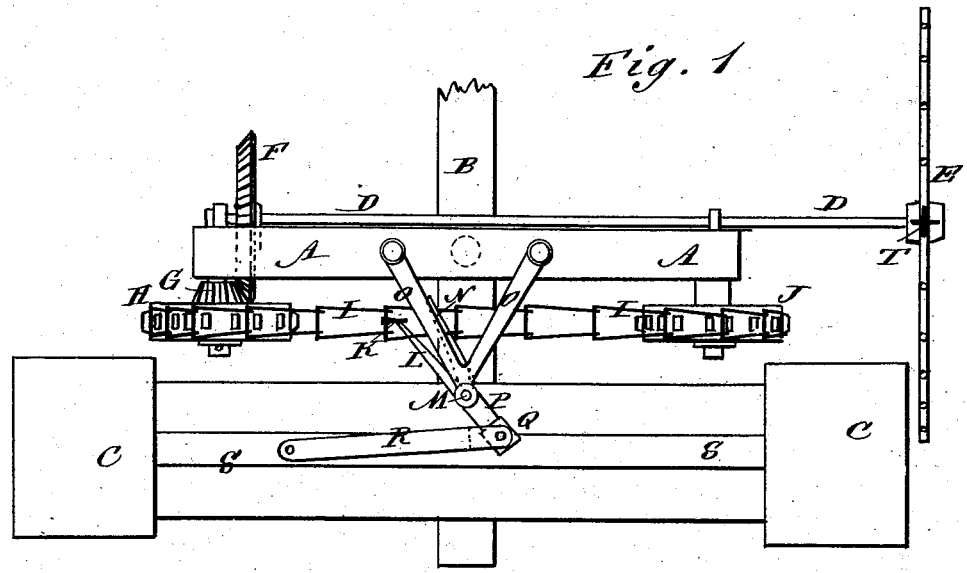
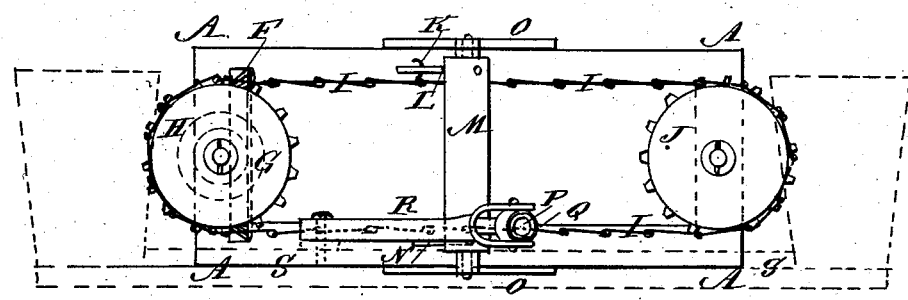
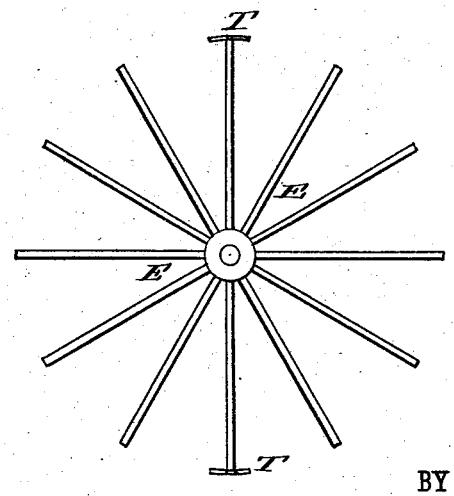
WITNESSES:
C. Neveux
C. Sedgwick
INVENTOR:
L. McGonigle
J. H. Bigham
BY Munn & Co.
ATTORNEYS.

UNITED STATES PATENT OFFICE.

LOUIS P. McGONIGLE AND JAMES H. BIGHAM, OF CATO, KANSAS.

SEED-DROPPING ATTACHMENT FOR CHECK-ROW CORN-PLANTERS.

SPECIFICATION forming part of Letters Patent No. 264,550, dated September 19, 1882.

Application filed May 1, 1882. (No model.)

To all whom it may concern:

Be it known that we, LOUIS P. MCGONIGLE and JAMES HENRY BIGHAM, both of Cato, in the county of Crawford and State of Kansas, have invented a new and useful Improvement in Seed-Dropping Attachments for Check-Row Corn-Planters, of which the following is a full, clear, and exact description.

Reference is to be had to the accompanying drawings, forming a part of this specification, in which similar letters of reference indicate corresponding parts in all the figures.

Figure 1 is a plan view of our improvement. Fig. 2 is a rear elevation of the same. Fig. 3 is a side elevation of the driving-wheel.

The object of this invention is to facilitate the planting of corn in accurate check-rows.

The invention consists in a seed-dropping attachment for corn-planters, constructed as will be hereinafter fully described.

A represents a frame, about three feet long and about ten or eleven inches high, and which is designed to be attached to the tongue B or the frame of the planter a little in front of the seed-boxes C.

In bearings attached to the forward sides of the ends of the frame A revolves a rod, D, to the outer end of which is attached a spoke-wheel, E, about twenty-nine inches in diameter. The spokes of the wheel E enter the ground, so that the said wheel will be turned as the machine is drawn forward.

To the inner end of the rod D is attached a gear-wheel, F, about eight inches in diameter, the teeth of which mesh into the teeth of the small gear-wheel G. The gear-wheel G is about two inches in diameter, and should make exactly four revolutions while the gear-wheel F makes one.

To the small gear-wheel G is attached or with it is rigidly connected a chain-wheel, H, around which passes an endless chain, I. The endless chain I also passes around a chain-wheel, J, pivoted to a journal attached to the other end of the frame A. The chain-wheels H J should each have fifteen points or teeth to engage with the links of the chain I, and said chain I should have sixty links.

To a link of the chain I is attached a finger or hook, K, which, as it passes along the upper part of the frame A, strikes against an arm, L, attached to the upper part of the upright shaft M, and turns the said shaft in one direction. As the finger or hook K passes back along the lower part of the frame A it strikes against a second arm, N, attached to the lower part of the shaft M, and turns the said shaft in the other direction. The ends of the shaft M are journaled to brackets, O, attached to the top and bottom bars of the frame A.

To the shaft M is attached a rearwardly-projecting arm, P, the outer end of which works in a band, Q, attached to the forked end of the pitman R. The outer end of the pitman R is pivoted to the seed-dropping slide S of the planter.

With this construction two hills will be dropped at each half-revolution of the drive-wheel E, so that the hills will be about three feet nine inches apart.

Upon the outer ends of two opposite spokes of the drive-wheel E are secured cross-heads T, to mark the line of the cross-rows, which marks will serve as a guide to the driver in the return crossing, so that he can plant the field in accurate cross-rows.

We are aware that seed-dropping attachments for planting corn in check-rows, having a spoke drive-wheel, beveled gears, and a finger-chain for tripping the seed-valve similar to ours are not new, and we do not claim this, broadly, as our invention; but

What we claim is—

The combination, with the wheel E, shaft D, beveled gears F G, chain-wheels H J, chain I, and hook K, of the vertical rock-shaft M, the arms L N thereon, the arm P, and the pitman R, operating the planter slide or gate, as shown and described.

LOUIS PHILLIPPE McGONIGLE.
JAMES HENRY BIGHAM.

Witnesses:
WM. SHELBY,
G. W. FOWLER.